Oct. 12, 1948.  A. F. ALLWEIN  2,451,425
FLOW METER
Filed Dec. 18, 1946

*INVENTOR.*
ALOYSIUS F. ALLWEIN
BY Arthur H. Swanson
ATTORNEY

Patented Oct. 12, 1948

2,451,425

UNITED STATES PATENT OFFICE 2,451,425

FLOWMETER

Aloysius F. Allwein, Philadelphia, Pa., assignor to The Brown Instrument Company, Philadelphia, Pa., a corporation of Pennsylvania Application December 18, 1946, Serial No. 717,007

4 Claims. (Cl. 73—405)

The general object of the present invention is to provide novel apparatus, characterized by its simplicity in structure and mode of operation, for producing a force substantially proportional to the square root of a variable fluid pressure differential. The invention was primarily devised and may be used with special advantage in measuring fluid flow in a conduit including a restriction producing a loss of head or pressure in the fluid flowing past the restriction. In such case, as is well known, the flow velocity in the conduit is substantially proportional to the square root of the difference between the fluid pressures in the conduit at the opposite sides of the restriction.

More specifically, the object of the present invention is to provide simple and effective means for maintaining a fluid pressure which varies in linear proportion to the square root of the difference between the pressures at the upstream and downstream sides of a restricted orifice in a conduit through which fluid flows.

A preferred form of flowmeter embodying the present invention comprises a frame or supporting structure adapted to tilt about a horizontal axis and normally having its center of gravity in the vertical plane including said axis. Said structure includes a U tube manometer having its uprising legs displaced from one another in a direction transverse to said axis, so that the displacement of sealing liquid held in the U tube from one leg to the other, normally moves the center of gravity of the structure transversely to said vertical plane. The pivoted structure also includes a rebalancing weight and means for turning it about a horizontal axis parallel to the first mentioned axis, and laterally displaced from the center of gravity of said weight, to shift the center of gravity of the pivoted structure back into its normal position in said plane when displaced therefrom. The turning movements of said weight are controlled by adjustments of a connection between said structure and weight comprising a fluid pressure chamber and a spring and means for varying the pressure in said chamber to adjust the position of said weight as required to return the center of gravity of the pivoted structure to its normal position when displaced therefrom by a change in the difference between the pressures in the upper end portions of the manometer legs.

In consequence, the fluid pressure maintained in said pressure chamber is a linear measure of the rate of flow measured by the flow meter, since, as those skilled in the art will recognize, the center of gravity of the rebalancing weight is moved horizontally for a distance proportional to the square root of the angular movement given the weight when the latter is turned to lower its center of gravity below the axis about which the weight is turned. The varying pressure maintained in said pressure chamber and controlling the angular position of the rebalancing weight may be transmitted to any usual or suitable pressure indicating or recording and control instrument to thereby provide a linear indication or record of the rate of flow creating the difference between the pressures in the upper ends of the manometer legs, and, if desired, to produce a corresponding control effect.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Figure 1:
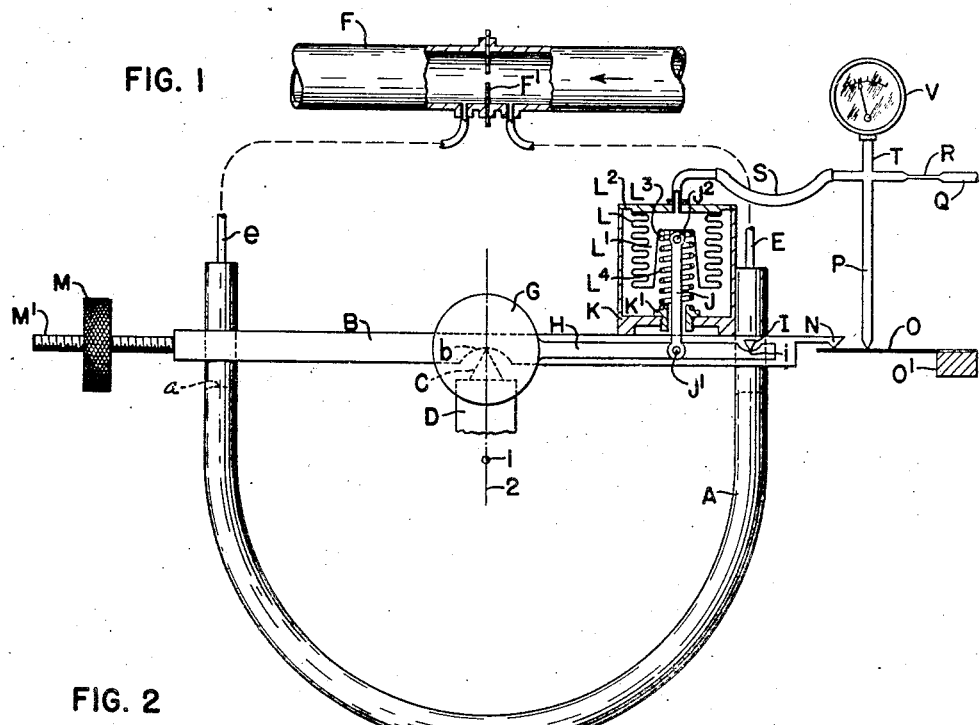
Figure 1 is a somewhat diagrammatic elevation of a flow meter with parts broken away and in section.

In the desirable form of the invention illustrated diagrammatically by way of example in Figure 1, A represents the U tube manometer element of a tilting differential pressure gauge. The manometer element is secured to a supporting structure in the form of a horizontal beam B pivoted to turn about a fulcrum axis $b$ at the upper edge of a knife edge bearing member C mounted on a stationary support D. As shown, the beam B is formed with a notch at its underside, the apex portion of which bears against the upper edge of the bearing C. As shown, the uprising legs of the manometer A are located at opposite sides of the axis $b$. A flexible conduit or capillary E transmits to the upper end of one manometer leg the pressure in a flow conduit F at the upstream side of the restricted orifice formed in the centrally apertured orifice plate F' extending across the conduit F. The conduit pressure at the downstream side of the orifice plate F' is transmitted to the upper end of the second leg of the manometer tube by a flexible tube or capillary $e$. The manometer tube contains a body $a$ of a suitable sealing liquid, usually mercury. The mercury level in each leg of the manometer is the same when there is no flow in the conduit F, but with fluid flowing through the conduit F the difference between the pressures in the conduit at the opposite sides of the orifice plate F'' will cause the mercury level to be higher in the manometer leg to which the tube $e$ is connected, than in the leg to which the tube E is connected.

In the normal condition of the apparatus shown in Figure 1, the center of gravity 1 of the pivoted structure comprising the beam B and the apparatus supported by the beam is normally within the vertical plane 2 which includes the horizontal axis $b$ about which the beam turns and is below that axis. Normally, the upper portions of the legs of the U tube occupy their vertical positions shown in Figure 1, but on a change in the rate of fluid flow in the conduit F and a consequent displacement of the sealing liquid from one leg to the other of the manometer A, the center of gravity of the pivoted manometer structure shifts to one side of the vertical plane 2, and said structure tilts slightly and thereby actuates fluid pressure mechanism to adjust a rebalancing weight G as required to so shift the center of gravity of the tilting structure that the latter returns to its normal position.

Figure 3:
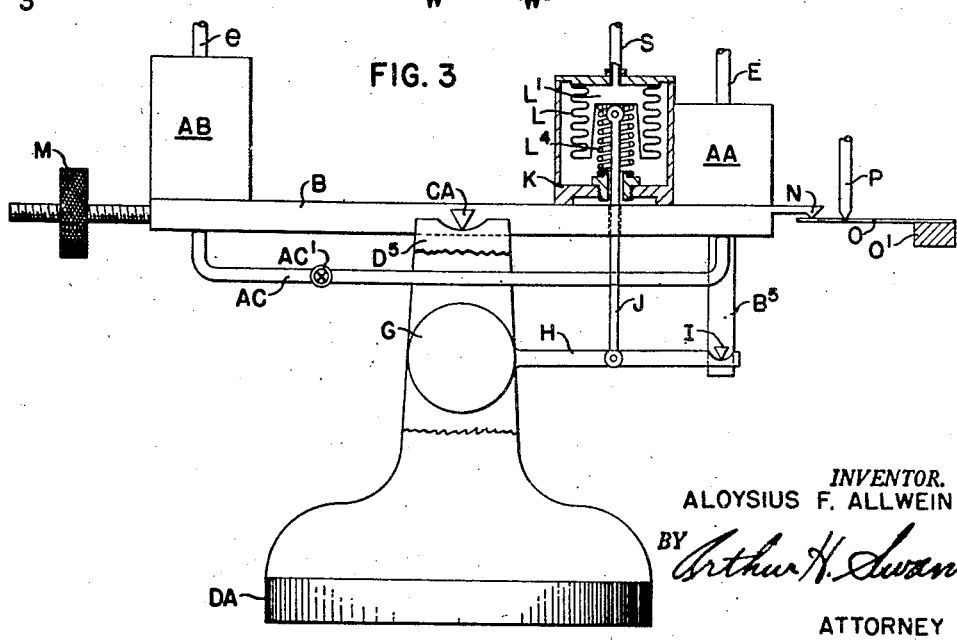
Figure 3 is a diagrammatic elevation of a portion of a flow meter of modified form.

As shown, the rebalancing weight G comprises a relatively large mass secured to one end of a lever H which has its other end pivotally connected to the beam B to turn relative to the latter about a horizontal axis $i$ parallel to the axis $b$ about which the beam B turns. As diagrammatically shown, the pivotal connection between the lever H and beam B comprises a knife edge bearing member I secured to the beam with its lower knife edge engaged by the bottom portion of the wall of a notch formed in the upper side along the line of the axis $i$ of the lever H. In the normal zero flow condition of the apparatus, shown in Figure 1, the center of gravity of the rebalancing weight G is in the horizontal plane which includes the pivoted axis $i$ of the lever H formed by the lower edge of the knife edge member I. In the preferred construction illustrated, the center of gravity of the rebalancing weight G is so located that in the zero flow condition of the apparatus it is intersected by the axis $b$ about which the beam B turns. While this arrangement may facilitate calibration, it is not essential. In some cases the axis of oscillation of the weight G may advantageously be located below the level of the axis of oscillation of the supporting structure, as shown in Figure 3.

The movement or tendency of the rebalancing weight G of Figure 1 to turn about the pivotal axis $i$ for the lever H, is normally neutralized by the tension of a vertically disposed suspension link J having its lower end pivotally connected at J' to the lever H intermediate the ends of the latter and shown as having its upper end pivotally connected at $J^2$ to the vertically movable element $L^3$ of a supporting device K. The latter comprises a support mounted on the beam B and a fluid pressure device comprising a bellows tube L formed of flexible metal. The tube L surrounds a variable pressure chamber L' having its upper end closed by a rigid end wall $L^2$. The latter is mounted on and secured to the support K, and the upper end of the bellows tube L may be brazed or otherwise secured to the end wall $L^2$. The lower end of the pressure chamber L' is closed by a movable end wall $L^3$. The latter, as shown, is in the form of an inverted cup with an outwardly extending flange at its lower end brazed to the lower end of the middle bellows L. The upper portion of the link J extends into the inverted cup shaped portion of the member $L^3$ and has its upper end pivotally connected to the upper end portion of the member $L^3$ at $J^2$.

A helical compression spring $L^4$ surrounds the upper portion of the link J and acts between the elevated central portion of the movable end wall of the member $L^3$ and an annular abutment member K' mounted in the support K. As shown, member K' is externally threaded and is received in an internally threaded opening formed in a bottom portion of the member K. Vertical adjustment of the abutment K' relative to the beam B may be effected by rotating the abutment in its threaded seat in the member K. As shown, the tilting gauge structure includes a counterweight M threaded on a horizontal screw M' attached to one end of the beam B for movement toward and away from the oscillation axis $b$ of the beam to effect a calibating adjustment of the center of gravity of the tilting structure.

For the purposes of the present invention, air is passed into, and permitted to pass out of, the bellows chamber L' to turn the rebalancing weight G about the axis $i$ of its pivotal connection with the beam B as required to return the center of gravity I of the tilting gauge to its normal position in the vertical plane 2 when deflected from that position by the displacement of mercury from one leg to the other of the tube A. To this end, the pressure in the chamber L' is regulated by means comprising a projection N carried by one end of the beam B and a flapper valve O adjusted by said projection to vary the pressure maintained in a bleed nozzle P. As shown, the flapper valve O is a horizontally disposed leaf spring O having one end secured to a stationary support O', and biased by its own resiliency for turning movement upward into the position in which it engages the lower end of a vent nozzle P and closes the vent orifice or nozzle passage therein. The nozzle P is vertically disposed above the spring O, and has its upper end connected to a source of air under pressure. The clockwise movement of the beam B about its axis $b$ causes the projection N to depress the free end of the flapper valve O and thus reduce its throttling action on air flow through the nozzle P and thereby reduce the pressure in said nozzle. On movement of the beam B in the counter clockwise direction, the projection N permits the flapper valve O to move upward under its own resiliency and thereby decrease or interrupt the outflow of air through the nozzle P and thus increase the pressure in the latter.

In normal operation, the nozzle pipe P continuously receives air at its upper end through the restricted orifice R in an air supply pipe Q. The latter is advantageously connected to a source of air under a suitable approximately constant pressure which may well be about 15 pounds per square inch. The pressure maintained in the nozzle P is transmitted to the bellows chamber L' through a flexible conduit S, and is transmitted through a branch pipe T to an instrument V. The latter may be a simple pressure indicating pressure gauge, or it may be a pressure recording and control instrument of any usual or suitable form, and may be located at a distance from the tilting pressure gauge including the manometer A. The latter is advantageously located in reasonably close proximity to the portion of the conduit F including the orifice plate F", so that the manometer will respond with suitable speed and accuracy to changes in the pressure drop in the orifice plate.

To avoid objectionable oscillation of the tilting pressure gauge, the latter may be provided with damping means of any usual or suitable form. As shown, the tube A is formed with a projection A' located between and engaging the juxtaposed movable end walls of a pair of damping elements W having their remote end walls stationary. The two bellows chambers are filled with liquid which flows from one bellows chamber to the other through a pipe W' when the one chamber is compressed by the projection A' as a result of a tilting movement of the manometer tube A. The resultant damping action may be varied by the adjustment of the throttle valve W² in the equalizing pipe W'. Excessive tilting movement of the tilting gauge is prevented by providing bellows devices W with internal stops W³, each of which limits the contraction of the corresponding bellows element W.

As previously indicated, the apparatus is so arranged and the counterweight M is so adjusted, that in the zero flow condition of the apparatus the upper portions of the legs of the manometer tube A will be vertical and the center of gravity l of the pivotal structure will be below and in the same vertical plane 2 with the axis b, and the center of gravity of the rebalancing weight G will be in the same horizontal plane as the axis i about which the element G is angularly adjusted relative to the beam B. On occurrence of fluid flow through the conduit F in the direction indicated by the arrow, the pressure transmitted through the tube E to the upper end of the manometer leg at the right of the axis b, will exceed pressure transmitted through pipe e to the upper end of the manometer leg at left of the axis. In consequence, mercury sealing liquid a will be displaced from the manometer leg at the right of the axis b to the manometer leg at the left of said axis. This displaces the center of gravity of the pivoted gauge structure to the left of the vertical plane 2 and results in a counter clockwise turning movement of the beam.

That tilting movement raises the projection N and permits the flapper valve O to move in the closing direction and thereby raise the pressure in the bleed nozzle pipe P above atmospheric pressure and correspondingly raise the pressure in the bellows chamber L'. When the pressure in the chamber L' thus exceeds the pressure of the atmosphere, the movable end wall L³ is moved downwardly against the action of the compression spring L⁴. This causes a corresponding down movement of the link J, and thus rebalances the weight downwardly about the pivotal axis i and thus moves the center of gravity l of the pivoted gauge structure toward the right. The downward movement of the weight G thus initiated introduces a balancing movement which continues until the center of gravity of the tilting gauge structure is returned to its normal position in the plane 2. When the apparatus is thus rebalanced, the projection N depresses the flapper valve O sufficiently to maintain the constant pressure in the bellows chamber L' required to hold the weight G in its balancing position. The weight G then remains stationary until another change in the rate of flow through the conduit F increases or decreases the difference between the pressures transmitted to the manometer by the pipes E and e. When such change in the rate of flow through the conduit occurs, the tilting gauge structure turns about its axis b to adjust flapper valve O as required to establish then maintain a new balancing pressure in the chamber L' corresponding to the new value of the differential of the pressures transmitted to the manometer through the tubes E and e.

Figure 2:
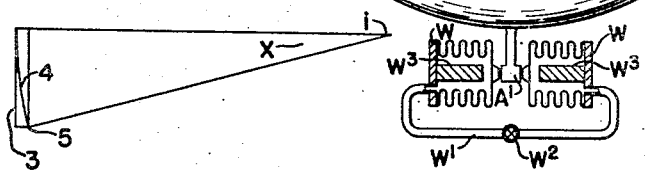
Figure 2 is a diagram illustrating the effect of an angular adjustment of the rebalancing element of the flow meter.

In the diagram shown in Figure 2, the line 3 represents the vertical plane including the center of gravity $g$ of the rebalancing weight G when the latter is in its zero flow condition and lies in the horizontal plane including the pivotal axis $i$ about which said weight is angularly adjusted. In Figure 2, line 4 represents the arc along which the center of gravity $g$ of the rebalancing weight moves to the point 5, as the weight has turned downward from its zero flow position through the angle X. The ratio of the length of the horizontal line extending from the pivotal axis $i$ to a point on the horizontal line directly above point 5 to the length of the line extending from the axis $i$ to the point 5 is the cosine of the angle X, and the length of the horizontal line extending from the line 3 to the point 5 represents the versed sine of the angle X, being equal to unity minus the cosine of the angle $x$.

As has long been known, the versed sine of an angle is approximately proportional to the square root of the angle. In consequence, in the arrangement collectively illustrated by Figures 1 and 2, as the center of gravity of the rebalancing weight G turns through a suitable angle X which may be 18° or so, the displacement of the center of gravity from the vertical plane represented in Figure 2 by the line 4, will at no time vary from the square root of the angle X by as much as two-tenths of one percent. As will be apparent, in any operative condition of the apparatus, the value of the angle X is thus in linear proportion to the difference between the pressures transmitted to the upper ends of the manometer tube legs. In consequence, the apparatus shown in Figure 1 operates to maintain an air pressure in the bellows chamber L' which varies in approximately linear proportion with the rate of fluid flow through the conduit F.

Heretofore various attempts have been made to utilize the fact that the versed sine of an angle is approximately proportional to the square root of the angle in measuring quantities, such as rates of flow, varying in accordance with the square root of a differential pressure. The arrangements heretofore proposed, however, have ordinarily involved the use of mechanism, ordinarily including a cam or cams unlike and inherently much more complicated than the apparatus shown in Figure 1, and no such apparatus of which I have knowledge, is operative to maintain a measurable fluid pressure varying in linear proportion with the square root of a differential pressure.

As those skilled in the art will recognize, the present invention may be utilized in apparatus differing in form from that shown diagrammatically in Figure 1, and some modifications of the apparatus shown in Figure 1 are illustrated in Figure 3. The simple U tube A shown in Figure 1 is replaced in Figure 3 by cylinders AA and AB and a pipe AC which is substantially smaller in cross section than said cylinders and connects their lower ends. The cylinders AA and AB are mounted on the supporting beam B, one adjacent each end of the beam. A U tube manometer comprising the parts AA, AB and AC may be made more compact and lighter in weight than a manometer having the same operative capacity and of the form shown in Figure 1. The tilting gauge structure of Figure 3 may thus have substantially less inertia than the tilting structure shown in Figure 1 with the consequent reduction in the risk of objectionable oscillation. The tendency of the tilting structure of Figure 3 to oscillate may be further reduced by the use of damping mechanism of the form shown in Figure 1 or of other known forms. In the construction shown in Figure 3, a regulable damping action may be obtainable by adjusting a valve AC' in pipe AC to variably throttle the flow through said pipe.

In Figure 3, a knife edge bearing member CA replaces the bearing member C of Figure 1, and extends through the beam B so that its ends form trunnions with knife edges at their undersides. Said knife edges engage bearing seats formed in the respective side portions $D^5$ of a pedestal member DA which is bifurcated to provide space between the side portion $D^5$ for the beam B and for the weight G. In Figure 3, the weight G is located directly beneath the beam B, and the knife edge bearing member I which is engaged by the end of the lever H remote from the weight G, is supported by a bracket $B^5$ secured to and depending from the beam B. The bracket $B^5$ may be bifurcated to provide supporting portions for the ends of the bearing member I at the opposite side of the lever H. An increase in the displacement of the weight G below the oscillation axis of the beam B tends of itself to increase the inertia of the tilting gauge structure, but gives certain mechanical advantages. In particular, it permits of an increase in the length of the link J. Such increase desirably reduces the departure of the link from parallelism with itself as the lower end of the link moves along an arc when the lever H is turned about its pivotal axis. It is to be noted, however, that such departure from parallelism with itself of the link J in a suitably designed apparatus of the type shown in Figure 1 may be made to have no really significant effect upon the accuracy of apparatus of the type shown in Figure 1. In each of the forms of the invention illustrated, it is practically feasible and desirable to employ a spring $L^4$ which has a low temperature coefficient, so that as the spring is compressed and expands through its operative range, the resultant change in spring force is in substantially precise proportion to the change in spring length.

While the calibration required to insure the proper location of the center of gravity of the tilting structure, whether effected by adjustment of the counter-weight M or in some other suitable manner, is facilitated by the location of the tilting weight so that its center of gravity is in the line of the axis $b$ about which the beam B turns, as shown in Figure 1, such location is not essential. The angular adjustment of the weight G about an axis in fixed relation to the beam B may be used to rebalance the tilting gauge structure regardless of the location of that axis relative to either the vertical plane or the horizontal plane including the axis $b$ of the beam B. With any location of said axis, however, the center of gravity of the weight G should be in the same horizontal plane with the pivotal axis of the weight when the apparatus is in its zero flow condition. The weight of the mass at the free end of the lever H may be several pounds and much greater than the weight of the lever arm H. In one form of the apparatus shown in Figure 1, the link J is under a tension of about 50 pounds, though in apparatus operating in the same general manner and having the same operative capacity, may be so designed that the force transmitted by the link may well be only a few pounds. Regardless of its location, the pivoted weight G serves in apparatus of the general character shown in Figures 1 and 2 to extract accurately the square root of the difference between the pressures transmitted to the manometer by the pipes E and e.

It is noted that in each of the embodiments of the invention a conventional pilot valve could be used between the nozzle P and the chamber L' if desired.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent it:

1. A differential pressure gauge comprising a supporting structure pivoted to turn about a horizontal axis and including a U tube manometer having uprising legs with their upper portions displaced from one another in a direction transverse to said axis whereby the displacement of the manometer sealing liquid from one leg to the other tends to turn said structure about said axis, a rebalancing weight pivotally connected to said structure to turn about a second horizontal axis parallel to said first horizontal axis and laterally displaced from the center of gravity of said weight, a weight adjusting mechanism mounted on said structure and comprising an expansible pressure chamber and a spring acting between said structure and weight to turn the latter about said second axis downwardly and upwardly as the pressure in said chamber is varied, means actuated by tilting movements of said structure to vary the pressure in said chamber and thereby turn the weight about said second axis as required to return said structure to an approximately constant normal position when turned out of said position by the displacement of sealing liquid from one to the other of the manometer legs, and means responsive to and indicating the varying pressure in said chamber and thereby providing a linear indication of the square root of the difference between the pressure in the upper end of said legs.

2. A differential pressure gauge comprising a supporting structure pivoted to turn about a horizontal axis and including a U tube manometer having uprising legs with their upper portions displaced from one another in a direction transverse to said axis whereby the displacement of manometer sealing liquid from one leg to the other tends to run said structure about said axis, a rebalancing weight pivotally connected to said structure to turn about a second horizontal axis parallel to said first horizontal axis and laterally displaced from the center of gravity of said weight, a weight adjusting mechanism mounted on said structure and comprising an expansible pressure chamber having a movable end wall connected to said weight and a spring acting between said structure and movable end wall in the direction to oppose downward turning movement of said weight, means actuated by tilting movements of said structure to vary the pressure in said chamber and thereby turn the weight as required to return said structure to an approximately constant normal position when turned out of said position by the displacement of sealing liquid from one to the other of the manometer legs, and means responsive to and indicating the varying pressure in said chamber and thereby providing a linear indication of the square root of the difference between the pressure in the upper ends of said legs.

3. A differential pressure gauge comprising a U tube manometer, means to mount said manometer for pivotal movement around a point between the legs of said U tube whereby said manometer will tilt as the differential pressure applied thereto is changed, a weight pivoted on said manometer with the center of gravity of the weight passing through a vertical plane through said point when the differential pressure is zero, pressure responsive means to tilt said weight out of said plane to return said manometer to a predetermined position upon movement of said manometer out of said position, and means operated by said manometer as it tilts to vary the pressure applied to said pressure responsive means.

4. A differential pressure gauge comprising a U tube manometer mounted to turn around a point between the legs of said U tube, said manometer sitting in a horizontal position when the differential pressure is zero, a weight mounted for pivotal movement on said manometer, said weight acting in a vertical plane passing through said point when the differential pressure applied to said manometer is zero, pressure responsive means to shift said weight around its pivot and out of said plane to return said manometer to its horizontal position upon movement thereof, and means operated by said manometer as it tilts to vary the pressure applied to said pressure responsive means.

ALOYSIUS F. ALLWEIN.

REFERENCES CITED

The following references are of record in the file of this patent:

UNITED STATES PATENTS

| Number | Name | Date |
|---|---|---|
| 1,160,679 | Wilkinson | Nov. 16, 1915 |
| 1,191,416 | Gibson | July 18, 1916 |
| 2,257,577 | Rosenberger | Sept. 30, 1941 |

FOREIGN PATENTS

| Number | Country | Date |
|---|---|---|
| 228,707 | Germany | Nov. 18, 1910 |
| 644,731 | Germany | May 12, 1937 |